(12) United States Patent
Tsuyuki (10) Patent No.: US 9,332,244 B2
(45) Date of Patent: May 3, 2016

(54) INFORMATION PROCESSING APPARATUS, CONTROL METHOD FOR THE SAME AND STORAGE MEDIUM

(71) Applicant: CANON KABUSHIKI KAISHA, Tokyo (JP)

(72) Inventor: Motomi Tsuyuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 13/675,326

(22) Filed: Nov. 13, 2012

(65) Prior Publication Data
US 2013/0141544 A1    Jun. 6, 2013

(30) Foreign Application Priority Data
Dec. 6, 2011    (JP) .................................. 2011-267257

(51) Int. Cl.
*H04N 13/02*    (2006.01)
*H04N 7/18*    (2006.01)
*G03B 21/00*    (2006.01)

(52) U.S. Cl.
CPC ........... *H04N 13/02* (2013.01); *H04N 13/0253* (2013.01)

(58) Field of Classification Search
CPC . H04N 13/0253; H04N 13/02; H04N 5/2351; H04N 13/0271; H04N 13/0025; H04N 5/2353; H04N 13/025; G01B 11/2513; G01B 11/2509; G06F 3/005; G06F 3/011; G06F 3/0304; G06T 7/0057; G01S 17/89; G01S 7/4863
See application file for complete search history.

(56) References Cited

U.S. PATENT DOCUMENTS

| | | | |
|---|---|---|---|
| 2002/0075456 A1* | 6/2002 | Shiratani | 353/31 |
| 2003/0156303 A1* | 8/2003 | Schnee et al. | 358/509 |
| 2010/0295941 A1* | 11/2010 | Jeong et al. | 348/135 |
| 2012/0154540 A1 | 6/2012 | Tsuyuki | |
| 2012/0287442 A1 | 11/2012 | Tsuyuki | |
| 2013/0050426 A1* | 2/2013 | Sarmast et al. | 348/46 |

FOREIGN PATENT DOCUMENTS

JP    2007-192608 A    8/2007

* cited by examiner

*Primary Examiner* — Jefferey Harold
*Assistant Examiner* — Sean Haiem
(74) *Attorney, Agent, or Firm* — Fitzpatrick, Cella, Harper & Scinto (57) ABSTRACT

An information processing apparatus comprises an image capturing unit configured to output a maximum tone value for each tone point at which exposure exceeds a saturation light amount; a calculation unit configured to calculate individual tone intersections by interpolating tone distributions of a first and second luminance pattern lights that were output by the image capturing unit; and a light quantity adjustment unit configured to adjust the quantity of light that enters the image sensor such that the tone values of tone points that are adjacent to the tone intersections and are used in calculation of the individual tone intersections are lower than the maximum tone value, and the tone value of at least one tone point other than the adjacent tone points is equal to the maximum tone value.

18 Claims, 11 Drawing Sheets

INFORMATION PROCESSING APPARATUS, CONTROL METHOD FOR THE SAME AND STORAGE MEDIUM

BACKGROUND OF THE INVENTION

1. Field of the Invention

The present invention relates to an information processing apparatus, a control method for the same, and a storage medium, and in particular relates to an information processing apparatus that captures images of a measurement object on which multiple patterns are projected and processes information for obtaining three dimensional shape data regarding the measurement object, a control method for the same, and a storage medium.

2. Description of the Related Art

There is widely-known three dimensional measurement in which a projection apparatus and an image capturing apparatus are arranged in a known relationship, the image capturing apparatus captures an image of a measurement object on which pattern light is projected by the projection apparatus, and three dimensional shape data regarding the measurement object is obtained.

Japanese Patent Laid-Open No. 2007-192608 discloses technology for obtaining the three dimensional shape of a measurement object by projecting first bright-dark pattern light having bright portions and dark portions arranged alternately with an arbitrary width and second bright-dark pattern light obtained by shifting the phase of the first bright-dark pattern light, capturing images thereof, obtaining the tone distribution of each image, and calculating positions on an image sensor that correspond to intersections between the first and second bright-dark pattern light.

When light enters various types of light detecting elements, such as a CCD image sensor, that are used in image sensors, quantally-generated shot noise is unavoidably generated at the same time as signals corresponding to light intensity are obtained. With a conventional intersection detection technique, intersections are obtained by interpolating tone values in the tone distribution of tones obtained by sampling first and second brightness patterns at each imaging pixel.

If captured images have been influenced by shot noise or other noise, intersections are calculated using tone values that include noise, and therefore the intersections have a margin of error due to noise. Regarding the influence that quantally-generated shot noise has on intersection detection, the amount of shot noise with respect to the intensity of light entering the image sensor relatively increases when the light intensity is low. For this reason, the SN ratio of the tone distribution decreases, and the margin of error in detected intersection positions increases.

On the other hand, when the intensity of light entering the image sensor is high, the amount of shot noise with respect to the light intensity is relatively low, the SN ratio improves over the case where the light intensity is low, and the margin of error in detected intersection positions decreases.

However, if the intensity of light entering the image sensor is higher than necessary, the tone values of pixels used in intersection detection approach and then reach the maximum tone value of the image sensor. For this reason, if intersections are detected by interpolating tone values, the margin of error increases, and the ability to perform precise three dimensional measurement is lost.

SUMMARY OF THE INVENTION

In view of the issue described above, the present invention provides technology that makes precise three dimensional measurement possible by improving the precision of intersection position detection.

According to one aspect of the present invention, there is provided an information processing apparatus comprising: a projection unit configured to project one of first luminance pattern light and second luminance pattern light that has a different luminance distribution on a measurement object; an image capturing unit configured to form the pattern light projected on the measurement object onto an image sensor as a tone distribution, output a maximum tone value for each tone point at which exposure exceeds a saturation light amount, and output a tone value corresponding to exposure for each tone point at which exposure is less than or equal to the saturation light amount; a calculation unit configured to calculate individual tone intersections by interpolating a tone distribution of the first luminance pattern light and a tone distribution of the second luminance pattern light that were output by the image capturing unit; and a light quantity adjustment unit configured to adjust the quantity of light that enters the image sensor such that the tone values of tone points that are adjacent to the tone intersections and are used in calculation of the individual tone intersections are lower than the maximum tone value, and the tone value of at least one tone point other than the adjacent tone points is equal to the maximum tone value.

According to one aspect of the present invention, there is provided a method for controlling an information processing apparatus, comprising the steps of: projecting one of first luminance pattern light and second luminance pattern light that has a different luminance distribution on a measurement object; forming the pattern light projected on the measurement object onto an image sensor as a tone distribution, outputting a maximum tone value for each tone point at which exposure exceeds a saturation light amount, and outputting a tone value corresponding to exposure for each tone point at which exposure is less than or equal to the saturation light amount; calculating individual tone intersections by interpolating a tone distribution of the first luminance pattern light and a tone distribution of the second luminance pattern light that were output in the image capturing step; and adjusting the quantity of light that enters the image sensor such that the tone values of four tone points that are adjacent to the tone intersections and are used in calculation of the individual tone intersections are lower than the maximum tone value, and the tone value of at least one tone point other than the adjacent tone points is equal to the maximum tone value.

Further features of the present invention will be apparent from the following description of exemplary embodiments with reference to the attached drawings.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Below, a configuration of a three dimensional measurement apparatus that has the functions of an information processing apparatus of the present invention will be described with reference to FIG. 1A. The three dimensional measurement apparatus includes a projection unit 102, an image capturing unit 103, a personal computer 104, and a personal computer 106, and the three dimensional measurement apparatus measures the three dimensional position of a measurement object 101. The projection unit 102 is a projector, for example, and projects light in predetermined luminance patterns on the measurement object 101 at predetermined timings. The image capturing unit 103 is a CCD camera, for example, and forms the luminance pattern light that was projected on the measurement object 101 onto an image sensor as a tone distribution, outputs the maximum tone value for each tone point at which the exposure exceeds the saturation light amount, and outputs a tone value corresponding to the exposure for each tone point at which the exposure is less than or equal to the saturation light amount.

The personal computer 104 controls the luminance pattern projection performed by the projection unit 102, and the personal computer 106 controls the image capturing performed by the image capturing unit 103 as well as outputs discretely sampled tone distributions from the luminance distributions that were formed on the image sensor and detects an intersection position. Adjustment of the quantity of light that enters the image sensor is performed by adjusting the intensity of the projected light, adjusting the exposure time in image capturing, or adjusting the gain in image capturing, for example. In the present embodiment, a light quantity adjustment value for controlling the quantity of light that enters the image sensor is calculated by the personal computer 106. In the case of adjusting the quantity of light by adjusting the intensity of the projected light, a light quantity adjustment value is sent from the personal computer 106 to the personal computer 104 and used to control the projection unit 102. In the case of adjusting the quantity of light by adjusting the exposure time in image capturing or adjusting the gain in image capturing, an instruction is sent from the personal computer 106 to the image capturing unit 103 and used to control the quantity of light that enters the image sensor. Note that a first luminance pattern 105a and a second luminance pattern 105b in which bright portions and dark portions are arranged alternately are shown as examples of luminance patterns used in the present embodiment. However, the first luminance pattern light and the second luminance pattern light may be different from that shown in FIG. 1.

Figure 1A:
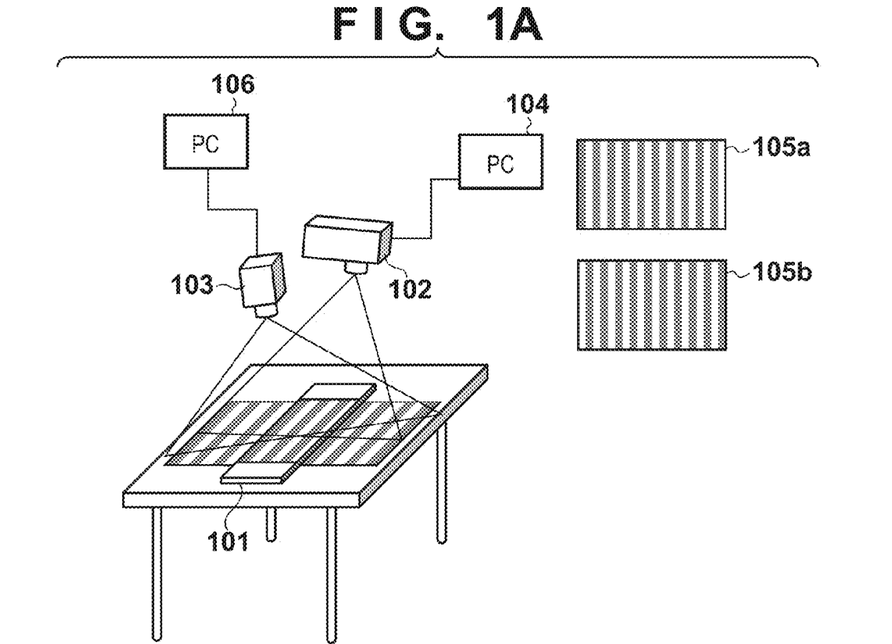
FIG. 1A is a diagram showing a configuration of a three dimensional measurement apparatus.

Also, although FIG. 1A shows a configuration in which the personal computer 104 and the personal computer 106 respectively control the image capturing unit 103 and the projection unit 102, a configuration is possible in which the image capturing unit 103 and the projection unit 102 are controlled by one personal computer serving as the control unit.

Figure 1B:
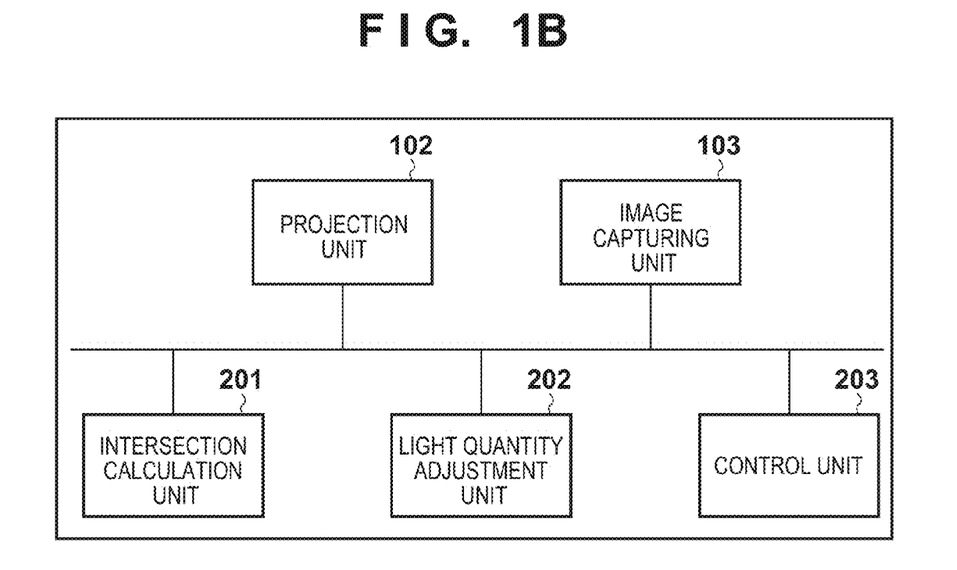
FIG. 1B is a diagram showing a block configuration of a processing unit of the three dimensional measurement apparatus.

FIG. 1B is a diagram showing a block configuration of a processing unit of the three dimensional measurement apparatus. The three dimensional measurement apparatus includes the projection unit 102, the image capturing unit 103, an intersection calculation unit 201, a light quantity adjustment unit 202, and a control unit 203. The projection unit 102 and the image capturing unit 103 are the same as those described using FIG. 1A. The intersection calculation unit 201 calculates intersection positions between the two types of luminance patterns that were projected on the measurement object, and these intersection positions are necessary for performing three dimensional measurement. The control unit 203 controls operations of the projection unit 102, the image capturing unit 103, the intersection calculation unit 201, and the light quantity adjustment unit 202, and also executes later-described processing of the present invention. The intersection calculation unit 201 calculates individual tone intersections by interpolating the tone distribution of the first luminance pattern light and the tone distribution of the second luminance pattern light that were output by the image capturing unit 103. The light quantity adjustment unit 202 adjusts the quantity of light that enters the image sensor of the image capturing unit 103.

Figure 2:
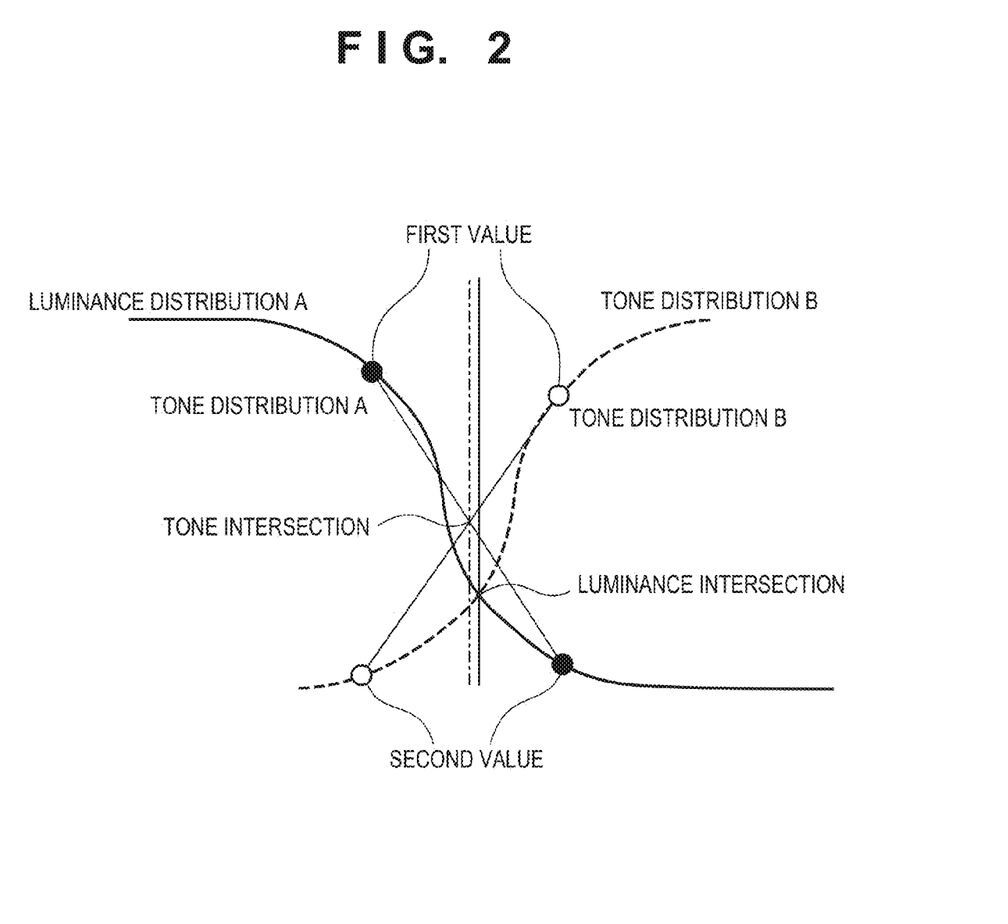
FIG. 2 is a conceptual diagram for describing processing for detecting an intersection position.

The following describes processing for detecting intersection positions with reference to FIG. 2. First, the projection unit 102 projects the luminance pattern 105a on the measurement object 101. Then the image capturing unit 103 captures an image of the measurement object 101 on which the luminance pattern 105a is projected. A tone distribution A is obtained as a result. Next, a projection operation and an image capturing operation are similarly executed for the luminance pattern 105b. A tone distribution B is obtained as a result. In FIG. 2, the solid line indicates the luminance distribution A on the image sensor corresponding to the luminance pattern 105a, and the dashed line indicates the luminance distribution B on the image sensor corresponding to the luminance pattern 105b. Also, the tone distribution A and the tone distribution B are numerical value strings obtained by sampling the luminance distribution A and the luminance distribution B for each pixel of the image sensor. The first value is the tone value corresponding to a bright portion in the luminance pattern 105a and the luminance pattern 105b, and the second value is likewise the tone value corresponding to a dark portion.

The luminance distribution A and the luminance distribution B are each made up of a portion having the first value, a portion having the second value, and a connecting portion that connects these two portions. The tone distribution A and the tone distribution B are discrete positions in the luminance distribution A and the luminance distribution B, but are similarly made up of a portion having the first value, a portion having the second value, and a connecting portion that connects these two portions.

There is a position where the luminance values are the same in the connecting portions of the luminance distribution A and the luminance distribution B, and this position is referred to as the luminance intersection position. There should also be a position where the luminance values are the same in the connecting portions of the tone distribution A and the tone distribution B as well, and this position is referred to as the tone intersection position. The tone intersection position is obtained by interpolating each tone distribution at the position where the magnitudes of the tone distribution A and the tone distribution B invert. Alternatively, the tone intersection position may be obtained by first obtaining a difference distribution by subtracting the tone distribution B from the tone distribution A, and then interpolating the position at which the difference value is 0.

When discrete tone distributions are sampled from luminance distributions, the tone intersection position is influenced by error arising in the sampling, thus resulting in a margin of error from the true luminance intersection position. Also, when luminance distributions influenced by shot noise or noise arising from other factors are formed on an image sensor, the tone intersection position that is obtained in the tone distributions output from the luminance distribution have a margin of error due to the influence of the noise.

Figure 10A:
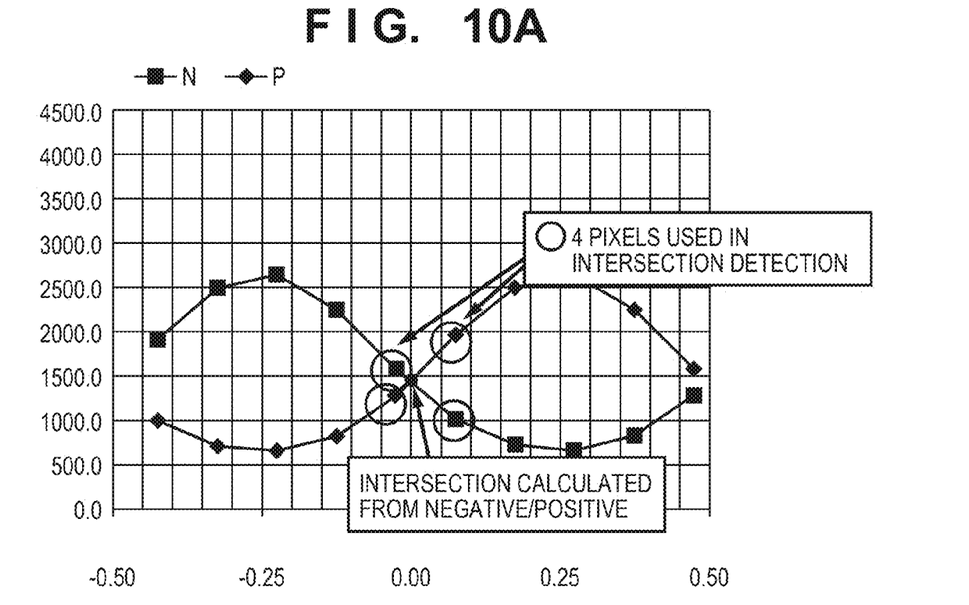
FIGS. 10A and 10B are diagrams for describing a concept for improving precision in intersection detection.
Figure 10B:
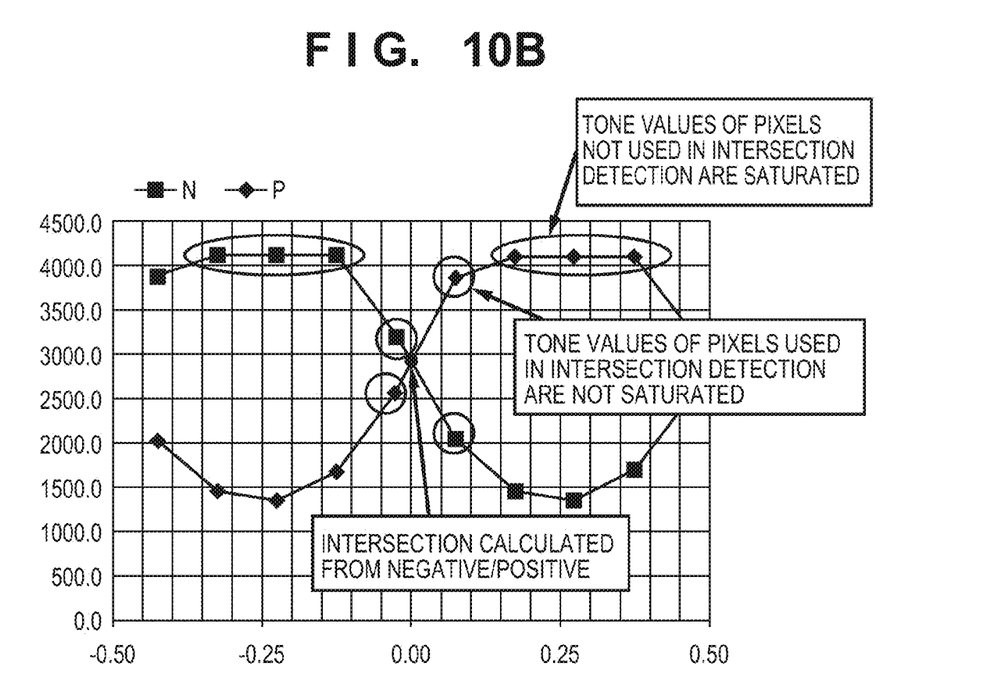

The following describes a concept for improving the precision of intersection position detection according to the present invention with reference to FIGS. 10A and 10B. FIG. 10A shows four tone points in the vicinity of a tone intersection that are used for tone intersection detection, such as those shown in FIG. 2. As shown in FIG. 10B, adjustment is performed so as to increase the quantity of light that enters the image sensor such that the tone values of the four tone points used for intersection detection (more specifically, the two high-tone side tone points) are lower than the maximum tone value of the image sensor, and such that at least one of the tone values of the other tone points is equal to the maximum tone value (i.e., is saturated). This adjustment can be performed using at least one of, for example, a method for adjusting the quantity of light used in pattern projection, a method for adjusting the exposure time of the camera, and a method for adjusting the gain in image capturing. Note that the quantity of light may be adjusted such that a predetermined number or more of tone points are equal to the maximum tone value. As another alternative, the quantity of light may be adjusted such that the tone values of all of the high-tone side tone points other than the adjacent tone points are equal to the maximum tone value. Also, adjustment may be performed so as to maximize the quantity of light that enters the image sensor while achieving the state in which the tone values of the tone points that are adjacent to the tone intersections and are used for calculating the individual tone intersection points are lower than the maximum tone value.

If the quantity of light is increased, the detected signal has a higher intensity, and detection precision can be improved. On the other hand, the tone values of the tone points that are not used in intersection detection do not influence detection precision error even if they exceed the maximum tone value. When the quantity of light is adjusted in this way, there is a low amount of increase in shot noise of the camera relative to the increase in signal intensity, thus resulting in an improved SN ratio and making it possible to reduce detection error.

Next, a procedure of preliminary preparation measurement processing according to the first embodiment will be described with reference to the flowchart of FIG. 3. Preliminary preparation measurement processing is processing for calculating an adjustment value for adjusting the quantity of light that enters the image sensor.

In step S301, the projection unit 102 projects light in the first luminance pattern 105*a*, in which bright portions and dark portions are arranged alternately, on the measurement object 101. Then the image capturing unit 103 captures an image of the measurement object 101 on which the luminance pattern 105*a* is projected. A tone distribution G1 is obtained as a result. In step S302, the projection unit 102 projects light in the second luminance pattern 105*b* on the measurement object 101. Then the image capturing unit 103 captures an image of the measurement object 101 on which the luminance pattern 105*b* is projected. A tone distribution G2 is obtained as a result.

In FIGS. 8, 801 to 805 indicate examples of tone distributions that are obtained. Although the maximum tone value of the image sensor is 255 in the present embodiment, the maximum tone value may be 4095 or another value depending on image capturing settings and processing. The horizontal axis represents the pixel position in the image sensor, and the vertical axis represents the tone value.

In step S303, the intersection calculation unit 201 searches for the intersection between the tone distribution G1 and the tone distribution G2.

Figure 9:
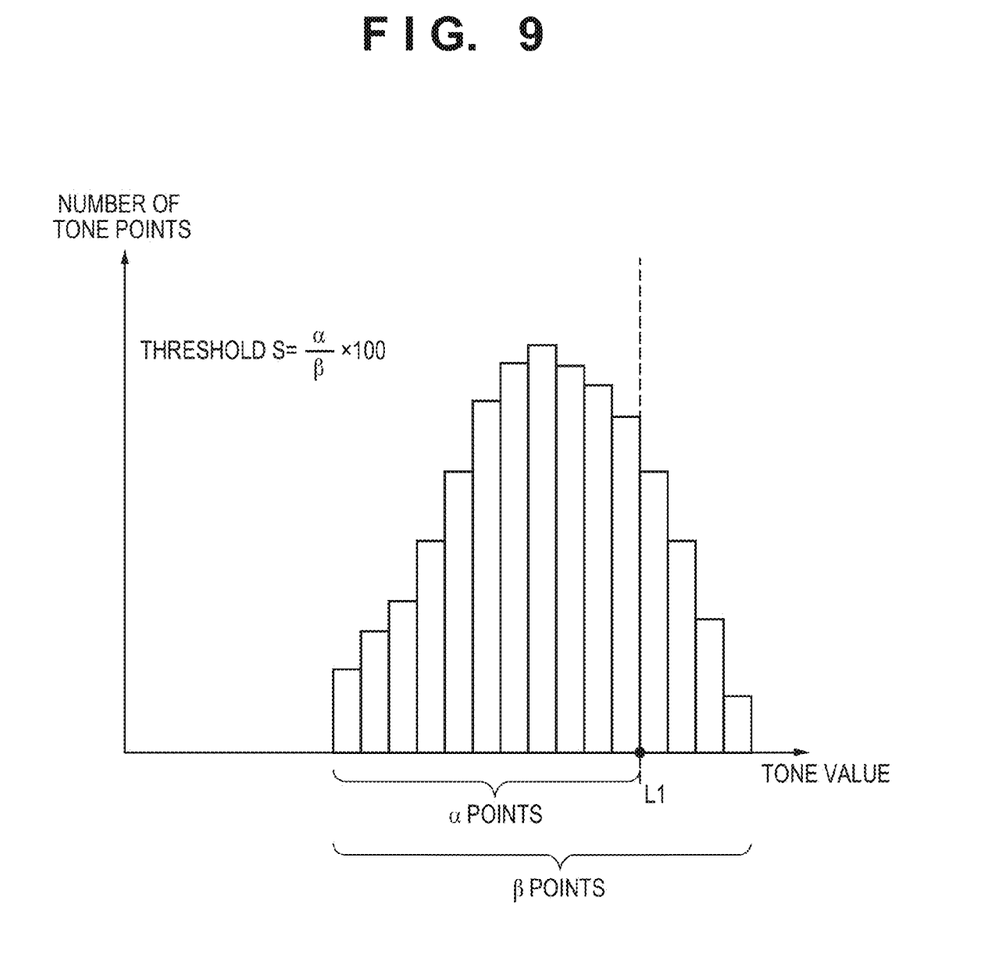
FIG. 9 is a diagram showing an example of a tone histogram.

In step S304, the control unit 203 generates a tone histogram containing the high-tone side tone points among the tone points that are adjacent to the intersection between the tone distribution G1 and the tone distribution G2 that was found in step S303. Here, the adjacent tone points are the four adjacent tone points that form the intersection (the intersection between straight lines connecting two tone points). The high-tone side tone points are the two tone points that are on the high-tone side among the four tone points. The tone histogram is a histogram obtained by extracting the high-tone side adjacent tone points for each intersection, and plotting the tone value on the horizontal axis and the number of tone points on the vertical axis. FIG. 9 shows an example of the tone histogram that is calculated.

Figure 8:
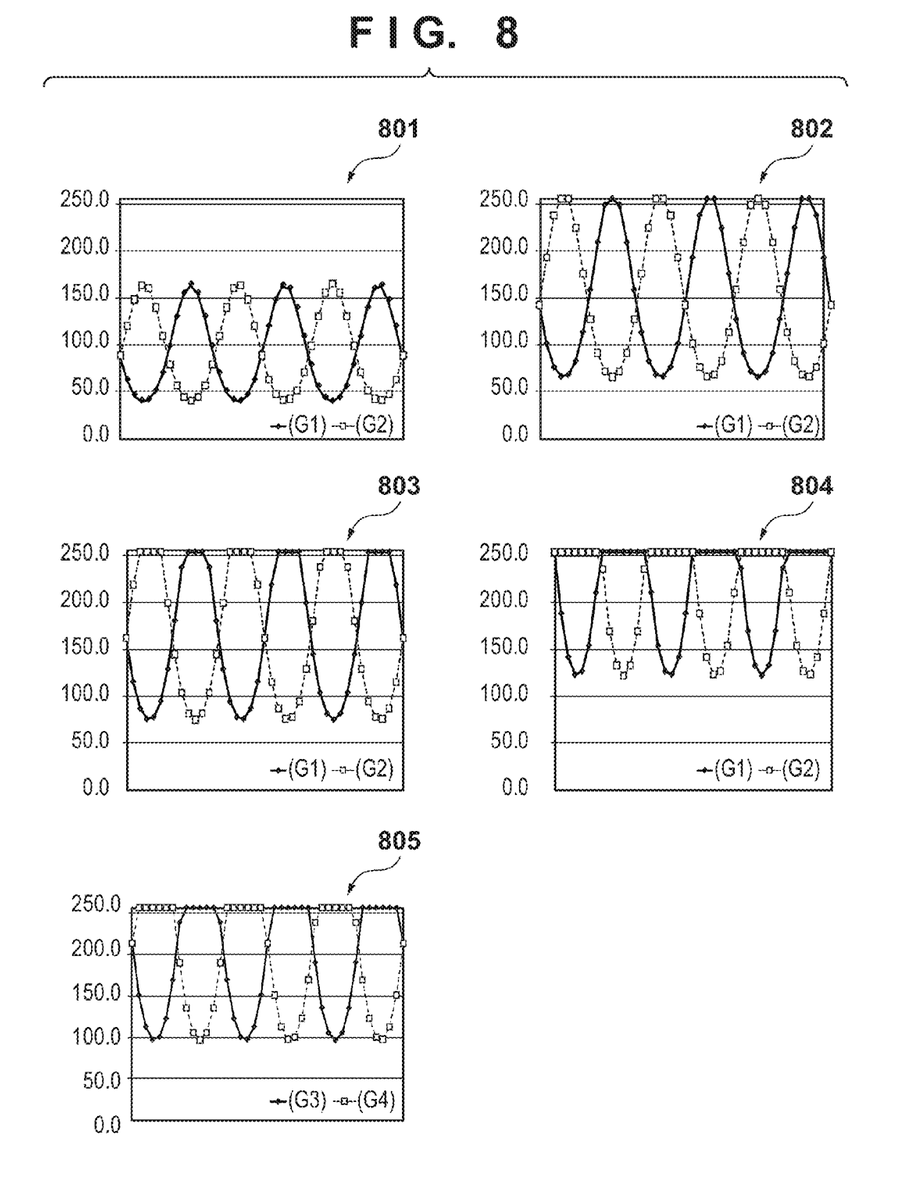
FIG. 8 is a diagram showing examples of tone distributions obtained in three dimensional measurement.

As shown by 804 in FIG. 8, if a portion of the tone values of the tone points adjacent to the intersection between the tone distribution G1 and the tone distribution G2 are equal to the maximum tone value of the image sensor, this shows that the quantity of light received by the image sensor is saturated in that portion. In step S305, the control unit 203 determines whether, among the high-tone side adjacent tone points, the percentage of tone points whose tone value is equal to the maximum tone value of the image sensor is greater than or equal to a threshold 1% (e.g., T=30). In the case of a determination that, among the high-tone side adjacent tone points, the percentage of tone points whose tone value is equal to the maximum tone value of the image sensor is greater than or equal to the threshold 1% (step S305: YES), there are cases where the later-described tone value L1 is equal to the maximum tone value of the image sensor, and it is difficult to accurately obtain the later-described light-quantity adjustment value k. The procedure therefore moves to step S306. On the other hand, in the case of a negative determination (S305: NO), the procedure moves to step S307.

In step S306, the light quantity adjustment unit 202 performs adjustment so as to change at least one of the intensity of projected light (projected light quantity), the exposure time in image capturing, and the image capturing gain in order to reduce the quantity of light that enters the image sensor. For example, light quantity adjustment is performed such that the quantity of light that enters the image sensor is reduced to half. However, adjustment needs only be performed so as to reduce the quantity of light, and it is not necessarily required to perform adjustment such that the quantity of light is reduced to half. Depending on the situation, adjustment may be performed such that the quantity of light is reduced to 10% or reduced to 90%. Thereafter, the procedure returns to step S301. Note that when measurement is performed again after adjusting the quantity of light, a tone distribution such as that indicated by 801 or 802 in FIG. 8 is obtained.

In step S307, the control unit 203 uses the tone histogram generated in step S304 to calculate the tone value L1, which is the tone value that contains a threshold S% (e.g., S=70) of the tone points in the tone histogram. In FIG. 9, letting $\beta$ be the total number of tone points contained in the histogram, L1 is the tone value at the position at which the number of contained tone points is $\alpha$. Here, the relationship $(\alpha/\beta)\times 100=S$ holds. The threshold S can be determined according to the condition of the intersection. In step S308, the control unit 203 calculates a maximum tone value Lmax from the tone distributions. The maximum tone value Lmax is the tone value of the tone point that corresponds to the extreme value whose value is high in the sine curve of the tone distributions. Note that the maximum tone value Lmax may be the average value of the top 5% or the top 10% of the tone values in the tone distributions. Also, in order to remove the influence of pixel defects of the image sensor and singularities at which high tone values are detected due to noise, the average value of the top 5% to 10% of the tone values of the tone distributions, or the average value of the top 7% of the tone values may be used. The Lmax calculation method may be arbitrarily changed according to the state of the measurement object 101 and the condition of the measurement environment.

In step S309, the control unit 203 sets a target tone value Lt for calculating the light quantity adjustment value k. The target tone value Lt is the tone value that contains the threshold S% of the tone points in the tone histogram when the quantity of light has been adjusted.

The range of the target tone value Lt is set such that the following relationship is satisfied.

Maximum tone value of image sensor$>=Lt>=$maximum tone value of image sensor$\times(L1/L$max$)$ For example, the target tone value Lt may be the maximum value in the above range, or may be the average of the maximum value and the minimum value. Here, assuming that the value of L1 is 120, the value of Lmax is 160, and the maximum tone value of the image sensor is 255, the following is obtained.

$255>=Lt>=255\times120/160=191$

Here, the average value "223" of the maximum value "255" and the minimum value "191" is set as the target tone value Lt.

In step S310, the light quantity adjustment unit 202 calculates the light quantity adjustment value k. Assuming that Lt=223 and L1=120, according to the relational expression Lt=k×L1, 1.86 is obtained as the light quantity adjustment value k. Next, a procedure of intersection detection processing in actual measurement according to the first embodiment will be described with reference to the flowchart of FIG. 4.

Figure 3:
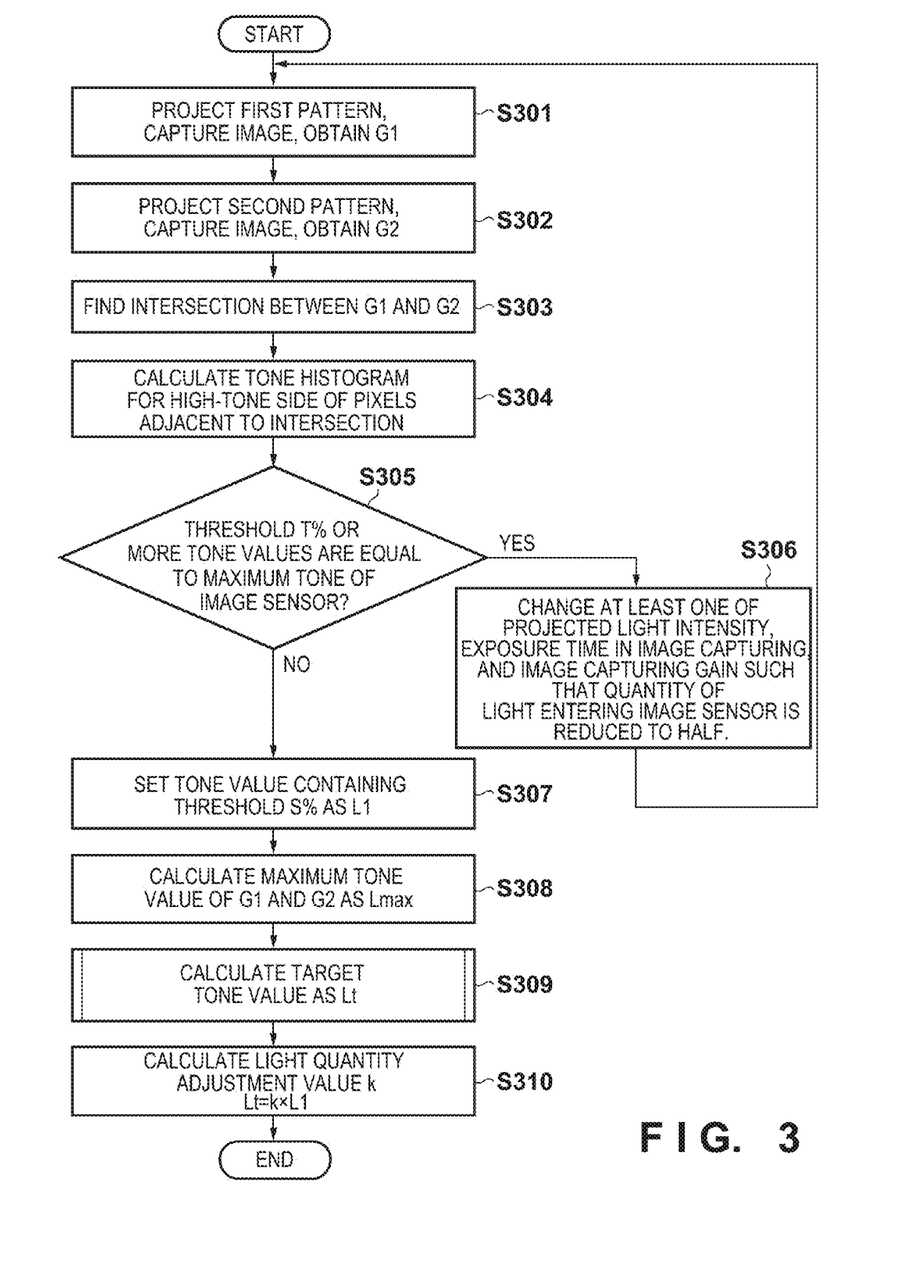
FIG. 3 is a flowchart showing a procedure of preliminary preparation measurement processing according to a first embodiment.
Figure 4:
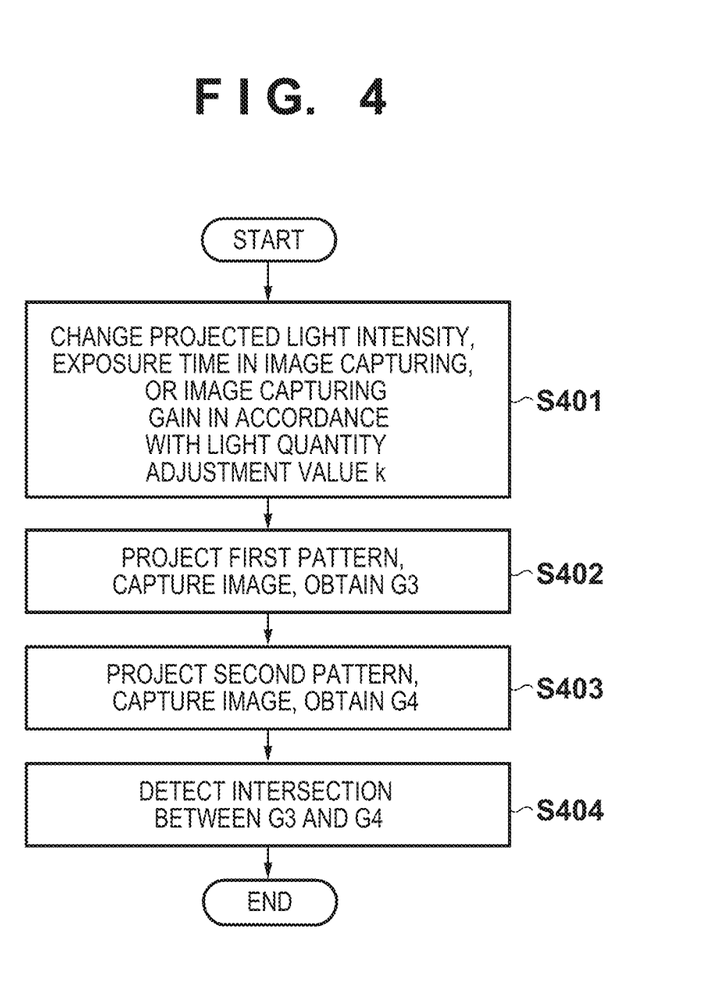
FIG. 4 is a flowchart showing a procedure of intersection detection processing in actual measurement according to the first embodiment.

In step S401, the light quantity adjustment unit 202 adjusts at least one of the intensity of projected light, the exposure time in image capturing, and the gain in image capturing in accordance with the light quantity adjustment value k that was calculated in the preliminary measurement processing in FIG. 3.

In step S402, the projection unit 102 projects light in the first luminance pattern 105a, in which bright portions and dark portions are arranged alternately, on the measurement object 101. Then the image capturing unit 103 captures an image of the measurement object 101 on which the luminance pattern 105a is projected. A tone distribution G3 is obtained as a result.

In step S403, the projection unit 102 projects light in the second luminance pattern 105b on the measurement object 101. Then the image capturing unit 103 captures an image of the measurement object 101 on which the luminance pattern 105b is projected. A tone distribution G4 is obtained as a result.

In step S404, the intersection calculation unit 201 detects the intersection between the tone distribution G3 and the tone distribution G4. In actual measurement, images of the measurement object 101 are captured while projecting the first luminance pattern light and the second luminance pattern light in accordance with the light quantity adjustment value k=1.86 that was calculated according to the processing in the flowchart of FIG. 3, thus obtaining tone distributions such as those shown in 803 in FIG. 8. Tone distribution intersections are detected based on these tone distributions.

The above-described processing in the flowchart of FIG. 4 then ends.

In the example of 803 in FIG. 8, the high-tone side tone values of the pixels adjacent to the intersection between the tone distributions are not equal to the maximum tone value of the image sensor, and at least one or more tone value other than the adjacent tone values is equal to the maximum tone value.

The high-tone side tone values of the pixels adjacent to the intersection can be obtained by obtaining the tone values that approach the maximum tone value of the image sensor. This enables relatively reducing the shot noise that appears in the tone values. When intersection detection is performed using the tone values of these pixels adjacent to the intersection, it is possible to reduce the influence of shot noise to a minimum and thus reduce intersection error.

Note that although the actual measurement processing in FIG. 4 is performed after the preliminary measurement processing in FIG. 3 in the present embodiment, the preliminary measurement processing may be followed by mass processing, or a configuration is possible in which preliminary processing is performed in advance to obtain information on the light quantity adjustment value before actual measurement.

As described above, the adjacent tone values that include the intersection detected from the first and second tone distributions are not equal to the maximum tone value of the image sensor, and a portion of the tone values other than the adjacent tone values are equal to the maximum tone value of the image sensor. Since the adjacent tone values that include the intersection are high values at this time, it is possible to relatively reduce the influence of shot noise, thus having an effect of enabling a reduction in error in the intersection that is detected.

Second Embodiment

Next, a procedure of preliminary preparation measurement processing according to a second embodiment will be described with reference to the flowchart of FIGS. 5A and 5B. In step S501, the projection unit 102 projects a uniform pattern having uniform luminance values in a predetermined range on the measurement object 101. The image capturing unit 103 then captures an image of the measurement object 101 on which the uniform pattern is projected. A tone distribution G0 is obtained as a result. Here, the predetermined range refers to the range between one intersection and at least one adjacent intersection when the pattern is projected on the measurement object 101.

In step S502, the control unit 203 determines whether, among the high-tone side adjacent tone points, the percentage of tone points whose tone value is equal to the maximum tone value of the image sensor is greater than or equal to a threshold P%. If the percentage of tone points whose tone value is equal to the maximum tone value of the image sensor is greater than or equal to the threshold P%, the quantity of light that enters the image sensor is too high, and therefore the tone distribution G0 is saturated. In this case, the shape of the tone distribution differs from its original shape, and therefore intersection error increases, and it becomes difficult to accurately obtain the light quantity adjustment value k. For this reason, in order to reduce the quantity of light that enters the image sensor, it is necessary to change the intensity of projected light, the exposure time, or the gain, and again project a luminance pattern having the maximum luminance value in a predetermined range and perform image capturing.

In the case of determining that the percentage of tone points whose tone value is equal to the maximum tone value of the image sensor is greater than or equal to the threshold P% (step S502: YES), the procedure moves to step S509. On the other hand, in the case of a negative determination (S503: NO), the procedure moves to step S503.

In step S503, the control unit 203 calculates and obtains an average value La of the tone distribution G0. The processing from step S504 to step S512 will not be described since it is similar to the processing from step S301 to step S309.

In step S513, the control unit 203 uses the average tone value La of the uniform pattern and the tone value L1 of a pixel adjacent to the intersection to calculate a tone value ratio M with the expression M=L1/La. For example, in the case where the threshold S is 70, if the tone value L1 that contains the threshold 70% of the tone points in the tone histogram is 80, and the average tone value La of the uniform pattern is 100, then the tone value ratio M=0.8 is obtained. This tone value ratio M is used when calculating the light quantity adjustment value k in the processing of FIG. 6 described below. The above-described processing in the flowchart of FIGS. 5A and 5B then ends.

Next, a procedure of intersection detection processing in actual measurement according to the second embodiment will be described with reference to the flowchart of FIG. 6. In step S601, a user arranges the measurement object 101. The measurement object may be different from that used in the preliminary measurement in FIGS. 5A and 5B. In step S602, the projection unit 102 projects a uniform pattern having uniform luminance values in a predetermined range on the measurement object 101. The image capturing unit 103 then captures an image of the measurement object 101 on which the uniform pattern is projected. A tone distribution G10 is obtained as a result.

The processing of step S603 and step S604 will not be described since it is similar to the processing of step S502 and step S509. In step S605, the control unit 203 calculates and obtains an average value La2 of the tone distribution G10.

Figure 5A:
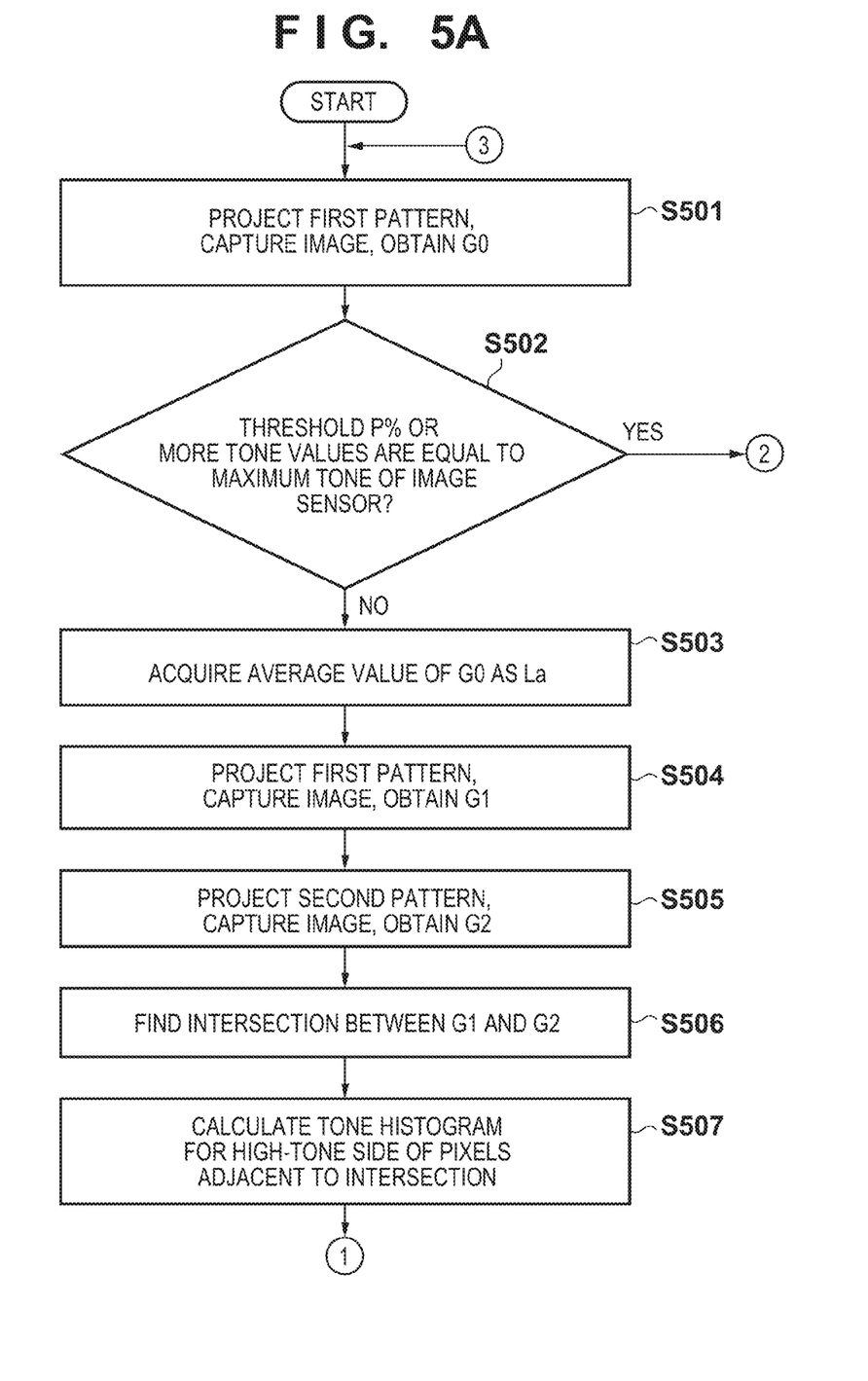
FIGS. 5A and 5B are flowcharts showing a procedure of preliminary preparation measurement processing according to a second embodiment.
Figure 5B:
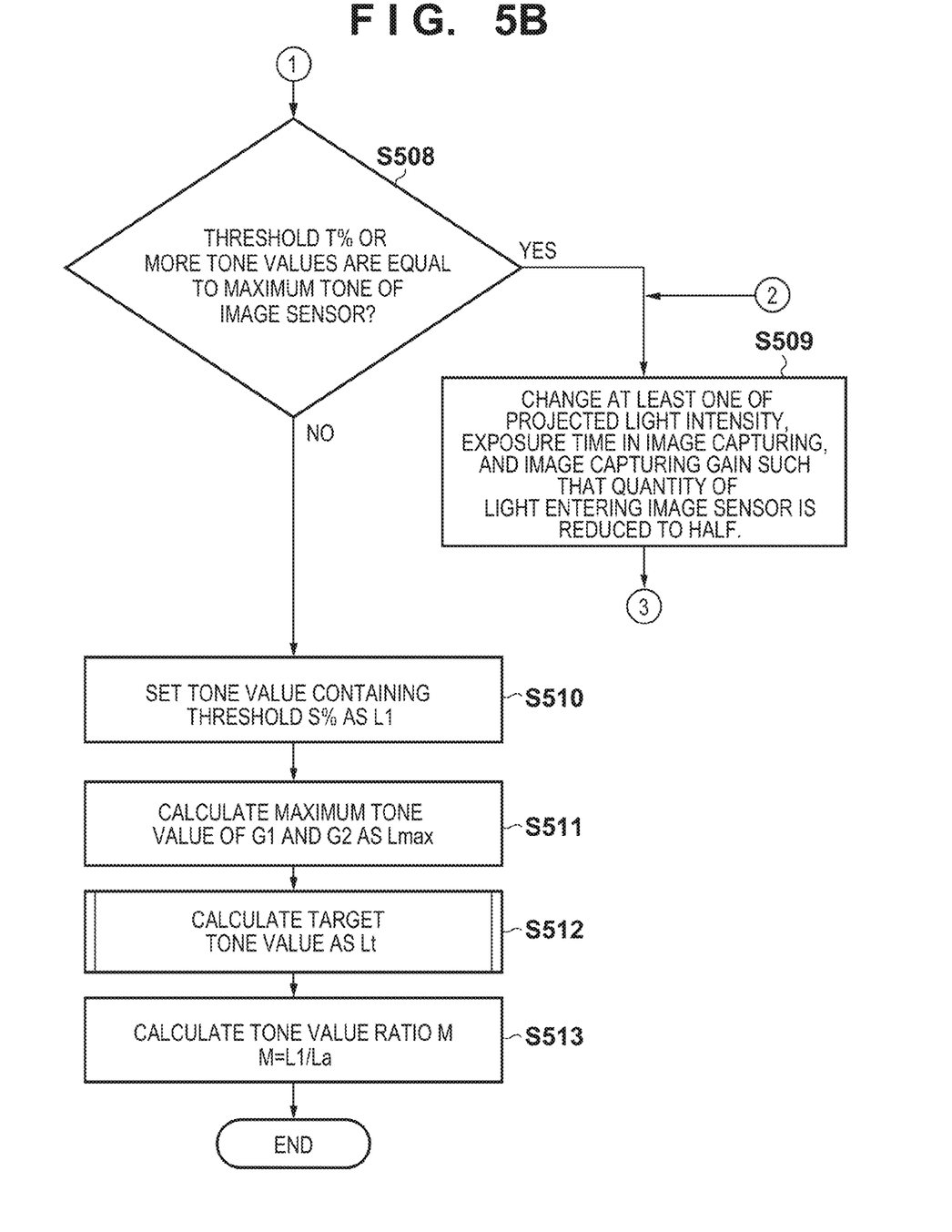
Figure 6:
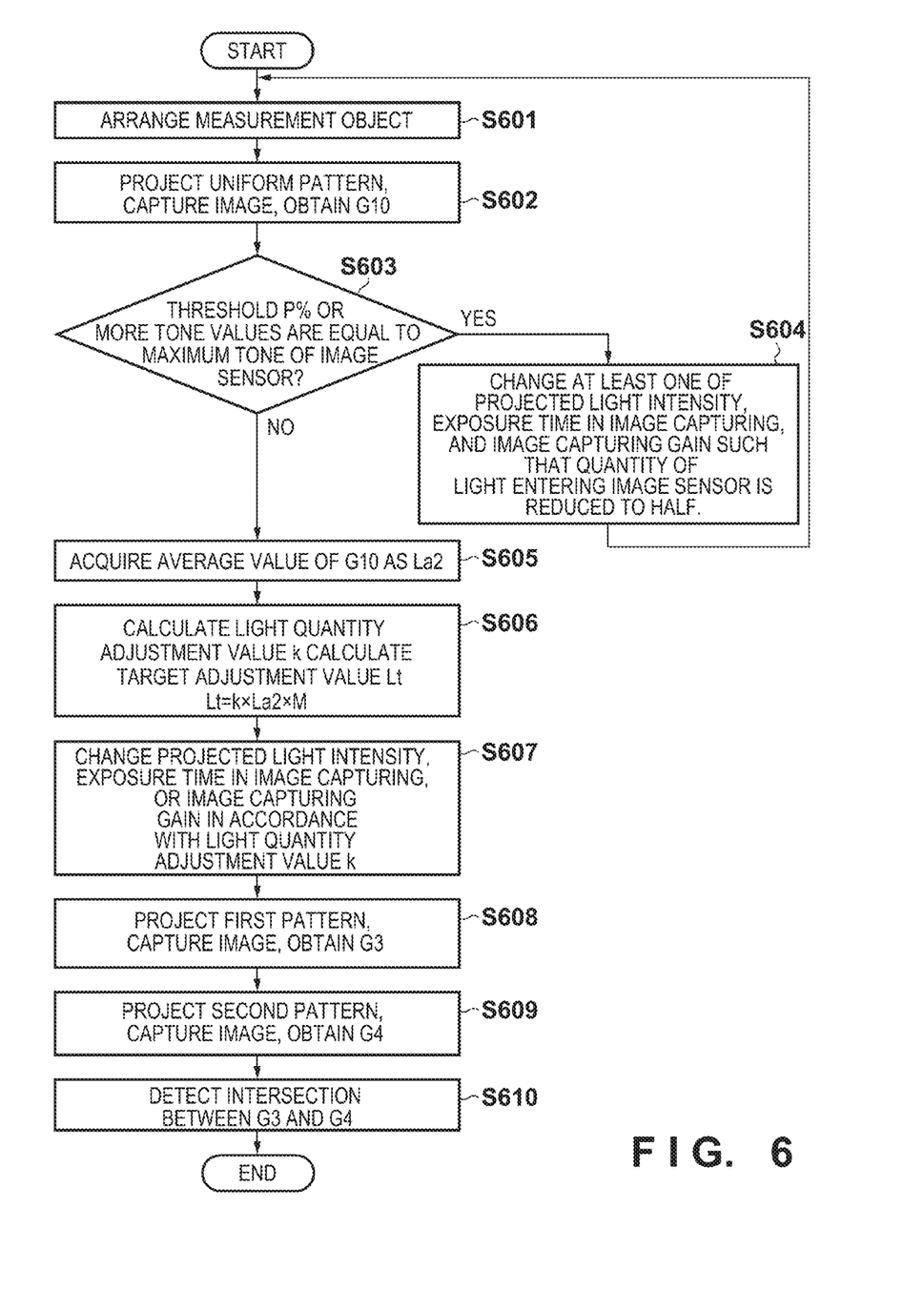
FIG. 6 is a flowchart showing a procedure of intersection detection processing in actual measurement according to the second embodiment.

In step S606, the light quantity adjustment unit 202 calculates the light quantity adjustment value k using the target tone value Lt and the tone value ratio M that were calculated in the preliminary measurement in FIGS. 5A and 5B. The light quantity adjustment value k is calculated with the relational expression Lt=k×La2×M.

In step S607, the light quantity adjustment unit 202 performs adjustment by changing at least one of the intensity of projected light, the exposure time in image capturing, and the image capturing gain in accordance with the light quantity adjustment value k that was calculated in step S606, in order to reduce the quantity of light that enters the image sensor.

In step S608, the projection unit 102 projects the first luminance pattern 105a, in which bright portions and dark portions are arranged alternately, on the measurement object 101 with the light quantity adjusted according to the light quantity adjustment value k. Then the image capturing unit 103 captures an image of the measurement object 101 on which the luminance pattern 105a is projected. A tone distribution G3 is obtained as a result.

In step S609, the projection unit 102 projects the second luminance pattern 105b on the measurement object 101 with the light quantity adjusted according to the light quantity adjustment value k. Then the image capturing unit 103 captures an image of the measurement object 101 on which the luminance pattern 105b is projected. A tone distribution G4 is obtained as a result. Note that tone distributions such as those shown in 805 in FIG. 8 are obtained here.

In step S610, the intersection calculation unit 201 detects the intersection between the tone distribution G3 and the tone distribution G4.

In the example of 805 in FIG. 8, a portion of the high-tone side tone values of the pixels adjacent to the intersection in a predetermined range of the tone distribution are equal to the maximum tone value of the image sensor, and therefore even if the intersection is detected using the adjacent tone values that are equal to the maximum tone value, the margin of error will increase, and accurate measurement will not be able to be performed. However, the high-tone side tone values of the other pixels adjacent to the intersection are near the maximum tone value of the image sensor and can be obtained, and therefore it is possible to relatively reduce the shot noise that appears in the tone values. Detecting the intersection using these adjacent tone values that are not equal to the maximum tone value enables suppressing the influence of shot noise and reducing intersection error.

According to the present embodiment, the light quantity adjustment value can be calculated using at least one uniform pattern that has uniform luminance values in a predetermined range, thus enabling a reduction in processing time in the case where the light quantity adjustment value is calculated after changing the measurement object.

Third Embodiment

Next, a procedure of preliminary preparation measurement processing according to a third embodiment will be described with reference to the flowchart of FIG. 7. In step S701, the projection unit 102 projects the first luminance pattern 105a, in which bright portions and dark portions are arranged alternately, on the measurement object 101. Then the image capturing unit 103 captures an image of the measurement object 101 on which the luminance pattern 105a is projected. A tone distribution G1 is obtained as a result.

In step S702, the control unit 203 searches the tone distribution G1 for a pixel that approximates a tone value threshold Q. The threshold Q is assumed to be the tone value at the midpoint between the maximum tone value and the minimum tone value of the tone distribution G1, for example. Alternatively, the threshold Q may be the average value of all of the tone values in the tone distribution G1, or the average value of the top 5% and the bottom 5% of the tone values.

In step S703, the control unit 203 generates a tone histogram containing the high-tone side tone points among the tone points that are adjacent to the pixel that approximates the threshold Q and was found in step S702.

The processing from step S704 to step S709 will not be described due to being similar to the processing from step S305 to step S310. Note that the processing of step S707 differs in that the maximum tone value is calculated from only the tone distribution G1.

Figure 7:
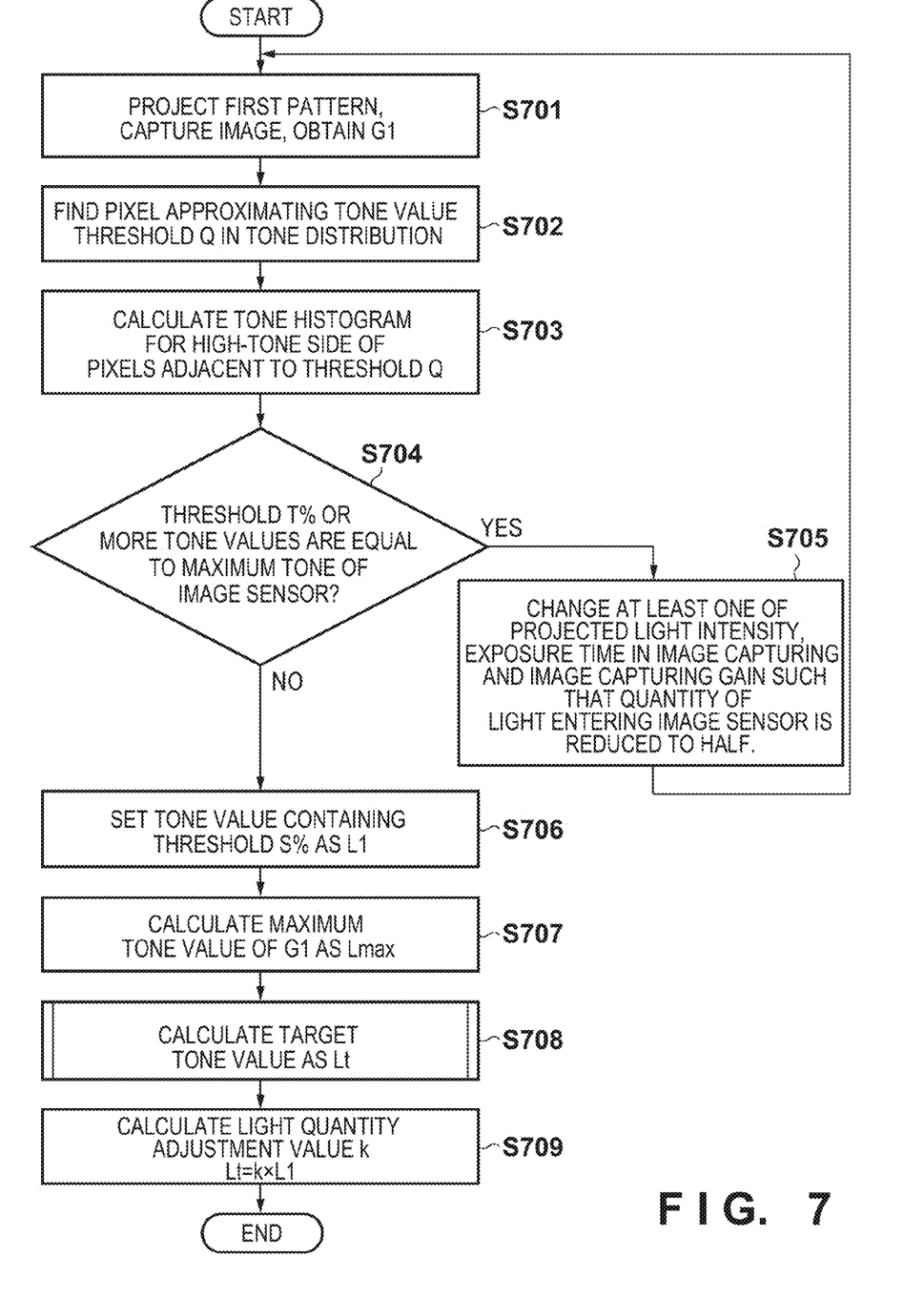
FIG. 7 is a flowchart showing a procedure of preliminary preparation measurement processing according to a third embodiment.

Actual measurement is executed according to the flowchart in FIG. 4, using the light quantity adjustment value k that was calculated in the flowchart of FIG. 7.

According to the present invention, precision in intersection position detection is improved, and it is possible to perform three dimensional measurement with good precision.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-267257 filed on Dec. 6, 2011, which is hereby incorporated by reference herein in its entirety.

What is claimed is:

1. An information processing apparatus comprising:
   a projection unit configured to project one of a first luminance pattern and a second luminance pattern that has a different luminance distribution on a measurement object;
   an image capturing unit configured to form the pattern projected on the measurement object onto an image sensor as a tone distribution, output a maximum tone value for each tone point at which exposure exceeds a saturation light amount, and output a tone value corresponding to exposure for each tone point at which exposure is less than or equal to the saturation light amount;
   a calculation unit configured to calculate individual tone intersections by interpolating a tone distribution of the first luminance pattern and a tone distribution of the second luminance pattern that were output by the image capturing unit; and
   a light quantity adjustment unit configured to adjust the quantity of light that enters the image sensor such that the tone values of tone points that are adjacent to the tone intersections and are used in calculation of the individual tone intersections are lower than the maximum tone value, and the tone value of at least one tone point other than the adjacent tone points is equal to the maximum tone value.

2. The information processing apparatus according to claim 1, wherein the light quantity adjustment unit adjusts the quantity of light that enters the image sensor so as to be maximized while achieving a state in which the tone values of the tone points that are adjacent to the tone intersections and are used in calculation of the individual tone intersection points are lower than the maximum tone value.

3. The information processing apparatus according to claim 1, wherein the light quantity adjustment unit adjusts the quantity of light that enters the image sensor by adjusting at least one of a projected light quantity of the projection unit that projects the pattern, an exposure time of the image capturing unit, and a gain of the image capturing unit.

4. A method for controlling an information processing apparatus, comprising the steps of:
   projecting one of a first luminance pattern and a second luminance pattern that has a different luminance distribution on a measurement object;
   forming the pattern projected on the measurement object onto an image sensor as a tone distribution, outputting a maximum tone value for each tone point at which exposure exceeds a saturation light amount, and outputting a tone value corresponding to exposure for each tone point at which exposure is less than or equal to the saturation light amount;
   calculating individual tone intersections by interpolating a tone distribution of the first luminance pattern and a tone distribution of the second luminance pattern that were output; and
   adjusting the quantity of light that enters the image sensor such that the tone values of tone points that are adjacent to the tone intersections and are used in calculation of the individual tone intersections are lower than the maximum tone value, and the tone value of at least one tone point other than the adjacent tone points is equal to the maximum tone value.

5. A non-transitory computer-readable storage medium storing a computer program for causing a computer to execute the steps of the method for controlling an information processing apparatus, the steps of the method comprising:
   projecting one of a first luminance pattern and a second luminance pattern that has a different luminance distribution on a measurement object;
   forming the pattern projected on the measurement object onto an image sensor as a tone distribution, outputting a maximum tone value for each tone point at which exposure exceeds a saturation light amount, and outputting a tone value corresponding to exposure for each tone point at which exposure is less than or equal to the saturation light amount;
   calculating individual tone intersections by interpolating a tone distribution of the first luminance pattern and a tone distribution of the second luminance pattern that were output; and
   adjusting the quantity of light that enters the image sensor such that the tone values of tone points that are adjacent to the tone intersections and are used in calculation of the individual tone intersections are lower than the maximum tone value, and the tone value of at least one tone point other than the adjacent tone points is equal to the maximum tone value.

6. An information processing apparatus comprising:
   a projection unit configured to project a first luminance pattern including a bright portion and a dark portion and a second luminance pattern, in which a bright portion and a dark portion are inverted with respect to the first luminance pattern, on a measurement object;
   an image capturing unit configured to form the pattern projected on the measurement object onto an image sensor as a tone distribution, output a maximum tone value for each tone point at which exposure exceeds a saturation light amount, and output a tone value corresponding to exposure for each tone point at which exposure is less than or equal to the saturation light amount;

a calculation unit configured to calculate intersections between a tone distribution of the first luminance pattern and a tone distribution of the second luminance pattern that were output by the image capturing unit; and a light quantity adjustment unit configured to adjust the quantity of light that enters the image sensor such that the tone value of at least one tone point other than the tone points in the vicinity of the intersections used in calculation of the intersections is equal to the maximum tone value.

7. A method for controlling an information processing apparatus, comprising the steps of:

projecting a first luminance pattern including a bright portion and a dark portion and a second luminance pattern, in which a bright portion and a dark portion are inverted with respect to the first luminance pattern, on a measurement object;

forming the pattern projected on the measurement object onto an image sensor as a tone distribution, outputting a maximum tone value for each tone point at which exposure exceeds a saturation light amount, and outputting a tone value corresponding to exposure for each tone point at which exposure is less than or equal to the saturation light amount;

calculating intersections between a tone distribution of the first luminance pattern and a tone distribution of the second luminance pattern that were output by the image sensor; and adjusting the quantity of light that enters the image sensor such that the tone value of at least one tone point other than the tone points in the vicinity of the intersections used in calculation of the intersections is equal to the maximum tone value.

8. A non-transitory computer-readable storage medium storing a computer program for causing a computer to execute the steps of the method for controlling an information processing apparatus, the steps of the method comprising:

projecting a first luminance s attern includin a bri ht s ortion and a dark s ortion and a second luminance pattern, in which a bright portion and a dark portion are inverted with respect to the first luminance pattern, on a measurement object;

forming the pattern projected on the measurement object onto an image sensor as a tone distribution, outputting a maximum tone value for each tone point at which exposure exceeds a saturation light amount, and outputting a tone value corresponding to exposure for each tone point at which exposure is less than or equal to the saturation light amount;

calculating intersections between a tone distribution of the first luminance pattern and a tone distribution of the second luminance pattern that were output by the image sensor; and adjusting the quantity of light that enters the image sensor such that the tone value of at least one tone point other than the tone points in the vicinity of the intersections used in calculation of the intersections is equal to the maximum tone value.

9. The information processing apparatus according to claim 1, wherein the light quantity adjustment unit adjusts the quantity of light that enters the image sensor such that the tone values of four tone points that are adjacent to the tone intersections and are used in calculation of the individual tone intersections are lower than the maximum tone value.

10. The method for controlling an information processing apparatus according to claim 4, wherein the quantity of light that enters the image sensor is adjusted such that the tone values of four tone points that are adjacent to the tone intersections and are used in calculation of the individual tone intersections are lower than the maximum tone value.

11. An image processing apparatus comprising:

a captured image obtaining unit configured to obtain a first captured image of a target object to which a first pattern is projected by a projection unit and a second captured image of the target object to which a second pattern in which the positions of a bright portion and a dark portion of the first pattern are inverted is projected by the projection unit;

a detection unit configured to detect positions of individual intersections between a waveform of pixel values of pixels constituting the first captured image and a waveform of pixel values of pixels constituting the second captured image; and a control unit configured to control an amount of light that enters an image sensor of an image capturing unit, based on pixel values of pixels in the vicinity of the detected intersections.

12. The image processing apparatus according to claim 11, wherein the control unit controls the amount of light that enters the image sensor of the image capturing unit, by controlling at least one of a parameter for controlling a brightness of a pattern projected by the projection unit and a parameter for controlling an amount of light that enters the image capturing unit, based on pixel values of pixels in the vicinity of the detected intersections.

13. The image processing apparatus according to claim 11, wherein the control unit comprises a determination unit configured to determine whether the pixel values of pixels in the vicinity of the intersections are saturated, and wherein the control unit controls the amount of light such that an amount of light that enters the image sensor is reduced, in a case where the number of intersections that has a neighborhood pixel that is determined as being saturated by the determination unit.

14. The image processing apparatus according to claim 11, wherein the pixels in the vicinity of the intersections are pixels that are used when the detection unit detects the intersections.

15. The image processing apparatus according to claim 11, further comprising a measurement unit configured to perform a three-dimensional measurement of the target object based on the positions of the intersections.

16. The image processing apparatus according to claim 11, further comprising the projections unit and the image capturing unit.

17. A method of controlling an image processing apparatus comprising:

obtaining a first captured image of a target object to which a first pattern is projected by a projection unit and a second captured image of the target object to which a second pattern in which the positions of a bright portion and a dark portion of the first pattern are inverted is projected by the projection unit;

detecting positions of individual intersections between a waveform of pixel values of pixels constituting the first captured image and a waveform of pixel values of pixels constituting the second captured image; and controlling an amount of light that enters an image sensor of an image capturing unit, based on pixel values of pixels in the vicinity of the detected intersections.

18. A non-transitory computer-readable storage medium storing a program for causing a computer to execute a method of controlling an image processing apparatus comprising:
- obtaining a first captured image of a target object to which a first pattern is projected by a projection unit and a second captured image of the target object to which a second pattern in which the positions of a bright portion and a dark portion of the first pattern are inverted is projected by the projection unit;
- detecting positions of individual intersections between a waveform of pixel values of pixels constituting the first captured image and a waveform of pixel values of pixels constituting the second captured image; and
- controlling an amount of light that enters an image sensor of an image capturing unit, based on pixel values of pixels in the vicinity of the detected intersections.

* * * * *